United States Patent [19]

Hsieh et al.

[11] 3,867,353

[45] Feb. 18, 1975

[54] POLYMERIZATION OF OXIRANES AND LACTONES

[75] Inventors: Henry L. Hsieh; Ollie G. Buck; Floyd E. Naylor, all of Bartlesville, Okla.

[73] Assignee: Phillips Petroleum Company, Bartlesville, Okla.

[22] Filed: Jan. 17, 1973

[21] Appl. No.: 324,514

[52] U.S. Cl............260/78.3 R, 260/78.3 UA
[51] Int. Cl.................C08g 17/017, C08g/25/00
[58] Field of Search................ 260/78.3 R, 78.3 UA

[56] References Cited
UNITED STATES PATENTS

| | | | |
|---|---|---|---|
| 3,259,607 | 7/1966 | Cherdron et al................... | 260/78.3 |
| 3,312,753 | 4/1967 | Bailey et al......................... | 260/823 |
| 3,396,125 | 8/1968 | Wofford et al....................... | 260/2 |
| 3,468,860 | 9/1969 | Hsieh................................ | 260/88.3 |
| 3,578,642 | 5/1971 | Mueller et al...................... | 260/78.3 |
| 3,682,865 | 8/1972 | Jenkins et al.................. | 260/75 EP |

FOREIGN PATENTS OR APPLICATIONS 1,026,924   4/1966   Great Britain

*Primary Examiner*—Melvin Goldstein
*Assistant Examiner*—E. A. Nielsen

[57] ABSTRACT

Monitored addition of lactone, or of lactone with oxirane or oxetane, to a polymerization mixture containing catalyst and a monohalooxirane, such as epihalohydrin, results in a copolymer of higher ultimate conversion than otherwise obtainable. Preferably, the monitored addition is commenced after the epihalohydrin has polymerized at least to some extent.

17 Claims, No Drawings

POLYMERIZATION OF OXIRANES AND LACTONES

FIELD OF THE INVENTION

The invention relates to copolymers of monohalooxiranes with lactones or with lactones and oxiranes or oxetanes. In another aspect, the invention relates to process for copolymerization of monohalooxiranes with lactones or lactones and oxiranes or oxetanes.

BACKGROUND OF THE INVENTION

Copolymerization processes of monohalooxiranes with lactones or with lactones and oxiranes generally have resulted in low conversion and lack of uniform composition in the copolymers obtained.

Lactone-epihalohydrin type copolymers are potentially useful in many specialty rubber applications. Improved conversion, more uniform composition, would permit wider application of such copolymers.

OBJECTS OF THE INVENTION

It is an object of the invention to provide higher conversions for copolymerizations of lactone or of lactones and oxiranes or oxetanes with epihalohydrins.

Other aspects, objects, and the several advantages of our invention will be apparent to one skilled in the art from the following disclosure and our appended claims.

SUMMARY OF THE INVENTION

Lactones, or lactones and oxiranes or oxetanes, are added to a polymerization mixture of catalyst and epihalohydrin either in multiple discrete increments or continuously or substantially continuously, or any combination, over all or at least some part of the course of the polymerization reaction. In this application, such addition is called monitored addition. In our preferred method, the addition of lactone or of lactone with oxirane or oxetane is commenced after the epihalohydrin has polymerized at least to some extent. The catalyst system which we employ is an organoaluminum compound, a beta-diketone, preferably as a metal salt of a beta-diketone, and water or lower alcohol.

DETAILED DESCRIPTION OF THE INVENTION

The lactone monomer, which can be a lactone, or admixtures of lactone and of oxirane or of oxetane, may be added to the polymerization mixture comprising initiator and epihalohydrin or other monohalooxirane wherein the addition can assume a variety of modes which we term "monitored addition". For example, the monitored addition can occur slowly and substantially continually throughout substantially the entire polymerization reaction period. Or, alternatively, the monitored addition can occur in multiple discrete increments wherein a fraction of the mixture to be added is present initially with subsequent fractions being added periodically during the reaction period. By multiple, we mean at least two. As another alternative, the monitored addition, either incremental or continuous, can be accomplished over some period less than the entire reaction period. In the case of incremental addition, the increments need not all be equal fractions of the total mixture to be added. Moreover and preferably, the addition is delayed to permit the epihalohydrin or other monohalooxirane to begin polymerization at least to some degree prior to the start of the monitored addition. Presently we prefer the delay to be of the order of a few minutes to a few hours, such as 1 to 120 minutes, presently preferred about 10 to 60 minutes. The monohalooxirane/catalyst admixture can contain, if desired, all or a portion of the oxirane or oxetane. In another aspect, the addition can be by a batch addition, but employing the delay mode as described.

Oxiranes and Oxetanes

Oxiranes and oxetanes employed in our invention can be represented by:

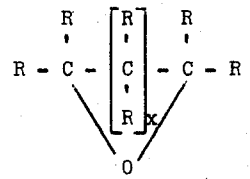

in which $x =$ in the case of oxiranes, and $x = 1$ in the case of oxetanes. These oxiranes and oxetanes can contain up to 20 carbon atoms per molecule, with the presently preferred carbon number range being 2 to 8. Lower molecular weight members are preferred since they tend to react more readily than higher molecular weight species and are usually more readily available for commercial practices. Each R can be hydrogen, or a radical which can be saturated aliphatic, saturated cycloaliphatic, monoolefinic aliphatic, diolefinic aliphatic either conjugated or nonconjugated, monoolefinic cycloaliphatic, diolefinic cycloaliphatic either conjugated or nonconjugated, aromatic, or combination thereof such as aralkyl, alkaryl, and the like. Some or all of the R radicals can be halogen-substituted, and can contain oxygen in the form of an acyclic ether linkage (—O—) or an oxirane group. Further, the cyclic ethers represented by the above formula can contain 1 or 2 oxirane groups, and up to 1 ether linkage. In addition, two R groups located on adjacent carbon atoms can represent a divalent aliphatic hydrocarbon radical which, together with the carbon atoms of the oxirane group, can form a cycloaliphatic hydrocarbon nucleus containing from 4 to 10 carbon atoms and preferably, for reasons of reactivity, 4 to 8 carbon atoms.

Examples of the above oxiranes and oxetanes include ethylene oxide; propylene oxide; 1,2-epoxyhexane, 3,4-epoxyhexane, 2,3-dimethyl-2,3-epoxypentane; 4,5-epoxyeicosane; 1,5-dichloro-2,3-epoxypentane; styrene oxide; 1-phenyl-1,2-epoxypropane; cyclohexylethylene oxide; oxetane; 3-phenyloxetane; 3-cyclohexyloxetane; 2,2-di(chloromethyl)oxetane; 2-benzyloxetane; allyl 2,3-epoxypropyl ethyl (allyl glycidyl ether); 2,6-octadienyl 2,3,7,8-diepoxyoctyl ether; 2,4-pentadienyl 2,3-diethyl-3,4-epoxybutyl ether; 4,5-diethyl-4,5-epoxy-2,6-octadiene; or mixtures; and the like.

Monohalooxiranes

In accordance with the invention, and as discussed below, it may be desired to initiate polymerization employing, initially, a monohalooxirane as the only monomer present and/or as the principal or majority monomer charged. Such monohalooxiranes, including the epichlorohydrins, can be generally represented by:

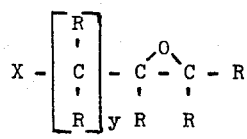

in which R is as defined above and each R group can be the same or different. X is chlorine, bromine, or fluorine, and y is an integer of 1 through 6. The total number of carbon atoms per molecule can range up to about 20, with 3 to 10 being preferred for reactivity. Examples include 1-chloro-2,3-epoxypropane (epichlorohydrin); 1-bromo-5,6-epoxyhexane; 1-chloro-3-phenyl-7,8-epoxyoctane; 1-bromo-4,5-epoxyeicosane; 3-bromo-5-cyclohexyl-6,7-epoxyheptane; or mixtures; and the like. The presently preferred monohalooxirane monomers of this class are the epihalohydrins which can be represented by:

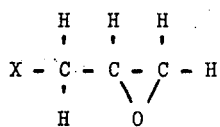

in which X is halogen, and with epichlorohydrin the preferred species.

Lactones

Lactones suitable for use in the instant invention can be represented by the formula:

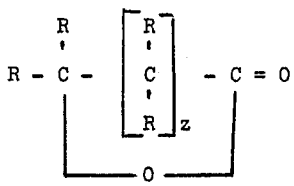

in which R is as defined above, and $z$ is an integer, preferably of 1 through 10. The R groups can be the same or different. The total number of carbon atoms per molecule can range widely, preferably up to 20, with 3 to 10 being preferred for reactivity.

Examples of lactones include beta-propiolactone, delta-valerolactone, epsilon-caprolactone, and lactones corresponding to the following acids: 2-methyl-3-hydroxypropionic acid; 3-hydroxynonanoic acid; 2-cyclopentyl-3-hydroxypropionic acid; 3-phenyl-3-hydroxypropionic acid; 2-n-butyl-3-cyclohexyl-3-hydroxypropionic acid; 4-benzyl-5-hydroxyvaleric acid; 4-(p-[n-octyl]phenyl)-6-hydroxycaproic acid; or mixture; and the like.

Initiator Composition

The initiator system employed in the process of our invention comprises an organoaluminum compound and water or lower alcohol of 1 to 4 carbons, optionally and preferably plus a beta-diketone, preferably as the metal salt of a beta-diketone.

Organoaluminum compounds include triorganoaluminum compounds, organoaluminum halides, and organoaluminum hydrides, and the like. These can be represented by $R_a'AlX_b'$ in which each $R'$ is a hydrocarbon radical such as alkyl, cycloalkyl, or aryl, or combination thereof such as arylalkyl, alkaryl, and the like. Each $R'$ group preferably contains up to 20 carbon atoms per R group, $X'$ is hydrogen halogen, and in the latter case is any one or more of fluorine, chlorine, bromine, or iodine. The integer $a$ represents 1, 2, or 3; $b$ is 0, 1, or 2; such that $a + b = 3$. The organoaluminum sesquihalides, sometimes described as mixtures of organoaluminum monohalides and organoaluminum dihalides, can be represented by $R_3'Al_2X_3'$.

Exemplary organoaluminum compounds include trimethylaluminum, triethylaluminum, tri-n-butylaluminum, triisobutylaluminum, tri-n-hexylaluminum, tri-n-eicosylaluminum, tricyclohexylaluminum triphenylaluminum, methyldiphenylaluminum, tribenzylaluminum, tris(1-naphthyl)aluminum, di-n-octylphenylaluminum, tri-4-tolylaluminum, dimethylchloroaluminum, methyldichloroaluminum, n-heptyldifluoroaluminum, methylisobutylchloroaluminum, diphenylbromoaluminum, dibenzylchloroaluminum, di-n-octylchloroaluminum, di-n-eicosyliodoaluminum, n-butyldihydroaluminum, diisopropylhydroaluminum, ethylmethylhydroaluminum, diphenylhydroaluminum, benzyl-n-dodecylhydroaluminum, dicyclohexylhydroaluminum, 2,6-di-n-butyl-4-n-hexylphenyldihydroaluminum, n-amylethylhydroaluminum, and the like, including mixtures.

It presently is preferred for most effective polymerization to employ the beta-diketone in the polymerization, and presently most preferred to employ the beta-diketones in the form of the described metal salts.

The metal salt of the beta-diketone can include the appropriate beta-diketone salts wherein the metal portion is a metal of Group IIA, IIIA, IVA, IB, IIB, IVB, VB, VIB, VIIB, or VIII, of the Periodic Table, using the Periodic Table of the Elements as shown in *Handbook of Chemistry and Physics*, 49th edition, Chemical Rubber Company (1968–69) page B-4. More specifically, elements of the above groups include beryllium, magnesium, calcium, strontium, barium; boron, aluminum, gallium, indium, thallium; silicon, germanium, tin, lead; copper, silver; zinc, cadmium, mercury; titanium, zirconium, vanadium, niobium, tantalum; chromium, molybdenum, tungsten; manganese; iron, cobalt, nickel, ruthenium, rhodium, palladium, osmium, iridium, and platinum.

Of the suitable metals, presently preferred for performance are calcium, strontium, barium, copper, beryllium, magnesium, zinc, cadmium, mercury, boron, aluminum, gallium, indium, thallium, silicon, germanium, tin, lead, silver, vanadium, chromium, molybdenum, tungsten, manganese, iron, cobalt, nickel, zirconium, and titanium.

For convenience, the metal salt of the beta-diketone can be represented by a generic formula

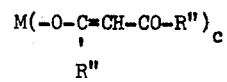

in which M represents the metal; and

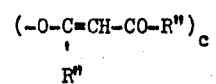

represents the diketone. In the generic formula employed, R'' represents a hydrocarbon radical, preferably of up to 10 carbon atoms per R'' group, and can be alkyl, cycloalkyl, aryl, or combination thereof. The R'''s can be the same or different. The $c$ is an integer equal to the valence of M.

Beta-diketones, which may, if desired, be combined with a metal as specified above to form the presently preferred corresponding metal salt of a beta-diketone, include any diketone reactive with the metals involved, presently preferred being those diketones of up to about 20 carbon atoms. Typical diketones include 2,4-pentanedione (acetylacetone); 3,5-heptanedione, 11,13-trieicosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n-butylphenyl)-1,3-propanedione; 1,11-diphenyl-5,7-hendecanedione; 1-phenyl-1,3-butanedione; 2,4-decanedione; 1-(3,5-dimethylcyclohexyl)-2,4-pentanedione, and the like, including mixtures.

The amount of metal salt of the beta-diketone employed in our catalyst system can vary over a wide range, as can the amount of water or lower alcohol. In general, a useful range for most purposes bases the amount of the metal salt of the beta-diketone on the amount of organoaluminum compound present such that a mole ratio of metal salt of beta-diketone:organoaluminum compound expediently employed lies in a range of about 0.01:1 to 0.5:1. Presently preferred for most polymerization purposes is a range of about 0.03:1 to about 0.3:1.

The metal salt of the beta-diketone may be used in amounts outside of the range without departing from the scope of the invention. Indeed, the metal salt of the beta-diketone can be eliminated and the diketone itself utilized. In some instances, though this presently is less preferred for most polymerizations, the metal salt of the beta-diketone can be omitted, and the diketone omitted, thus utilizing only the organoaluminum compound and the water or lower alcohol. In such process, the lower limit of the broad range cited then would be zero rather than 0.01. However, presently it is preferred to employ the beta-diketone, and more preferred to employ the beta-diketone as the metal salt thereof.

While water presently is preferred, a lower alcohol such as methyl, ethyl, any of the propyl or butyl alcohols, or mixtures, including mixtures with water, can be employed. The quantity of water or lower alcohol employed in the catalyst system conveniently can be based on the amount of organoaluminum compound component. The amount presently suggested is in a range of about 0.02 to about 1.6 moles of water or alcohol per mole of organoaluminum compound, presently about 0.1 to 1, though somewhat less than 0.02 and more than 1.6 can be utilized where desired.

Polymerization Process

The amount of catalyst used in the process of our invention can vary over a broad range. The catalyst level is conveniently specified on the basis of the organoaluminum compound component of the catalyst system. As a general rule, the amount of catalyst preferably is maintained within the range of about 1 to 100 gram millimoles of organoaluminum compound per 100 grams of monomer being polymerized and more preferably in the range of about 5 to 40 gram millimoles of organoaluminum compound per 100 grams of monomer. By monomer is meant the total amount of all monomers being polymerized.

Of 100 parts total monomers, the lactone portion should represent about 0.5 to 95 parts, preferably about 2 to 50 parts. The nonlactone portion can be divided in any desired ratio between the oxirane or oxetane and the monohalooxirane depending on the polymer properties desired. The nonlactone portion can comprise a mixture of oxirane and oxetane. For maximum solvent resistance in the final copolymer, the monohalooxirane content should constitute more than about 50 weight percent of the nonlactone portion. For optimum low temperature properties, the monohalooxirane content should constitute less than about 50 weight percent of the nonlactone portion.

The temperatures and pressures at which the polymerization reaction of our invention is effected can vary over a rather wide range. Expediently, the reaction is conducted at temperatures within the range of about 5° C. to 150° C., and preferably within the range of about 30° C. to 100° C. Polymerization preferably is conducted at pressures which will maintain the reactants and diluents substantially in the liquid state, and such pressures can include superatmospheric pressures upwards of several thousand pounds per square inch, if desired.

The duration of the polymerization reaction depends on temperature, pressure, activity of the particular initiator system being employed, and convenience. Usually, the process can be conducted for a period of about a few minutes or less to upwards of 100 hours or more. A presently preferred range is from about 10 minutes to 50 hours.

To improve the efficiency of the polymerization, it presently is preferred that the reaction be conducted in the presence of diluent. Suitable diluents include paraffinic, cycloparaffinic, aromatic hydrocarbons, and halogenated hydrocarbons, such as those containing 4 to 10 carbon atoms per molecule, including butane, pentane, hexane, decane, cyclopentane, cyclohexane, methylcyclohexane, benzene, chlorobenzene, toluene, xylene, ethylbenzene, mixtures and the like. Since the actual diluent employed is largely a matter of choice, it is feasible to employ other diluents not herein otherwise identified without departing from the spirit and scope of our invention.

Ethers, e.g., tetrahydrofuran and dioxane, may be employed where desired, usually conveniently by admixture with the diluents employed for polymerization purposes, since very small amounts of the ethers act as catalyst activators, tending to increase reaction rates markedly.

Termination of the reaction, removal of catalyst, removal of polymer, and so on can be carried out in a conventional manner. The resulting polymer can be isolated, for example, by coagulation with alcohol such as isopropyl alcohol or in a hydrocarbon such as pentane. Commercial practices frequently involve steam stripping to remove volatiles.

Polymers made in accordance with our invention can be cured in several ways. If a halogenated monomer is employed, e.g., epichlorohydrin, curing reactions can be utilized that involve the halogen atoms in the polymer. Alternatively, if a reactant containing a carbon-carbon double bond is employed, e.g., allyl glycidyl ether, the unsaturation present in the polymer can be utilized for sulfur-based cure methods.

Suitable additives such as antioxidants, stabilizers, pigments, and the like can be added to the product of the instant invention.

EXAMPLES

The following examples are intended to assist in illustrating the effectiveness of our invention. Particular species employed, amounts used, polymers produced, should be considered as illustrative, and not as limitative of the reasonable scope of our invention.

Example I

A series of runs was made wherein an epihalohydrin as the oxirane was copolymerized with a lactone in the presence of a catalyst comprising triisobutylaluminum, zinc acetylacetonate and water. In runs, numbers 1 and 3, the lactone was added to the reactor in a single batch, but in runs 2 and 4 of the invention, the lactone was added in periodic increments as the monitored mode.

In each run, the reactor was charged with solvent or diluent, purged with nitrogen, the reactants added with the initiator being charged last, and the polymerization allowed to proceed. The reaction was terminated with water and/or an alcohol and the coagulated rubbery product allowed to settle. The rubbery product was removed, washed, and then dried under reduced pressure. Results are shown in Table I.

lactone along with other reaction components. The superiority is shown clearly by the improved conversion values in runs 2 and 4 in Table I above.

Example II

Continuous addition throughout the reaction period rather than incremental addition also can be employed according to the monitored mode addition of our invention. Moreover, and preferably, the commencement of such monitored addition is somewhat delayed. In run 5, a control run, all monomer was charged initially. In runs 6, 7, and 8, caprolactone was added continuously according to our monitored mode. Results are shown in Table II.

TABLE II

| Run | 5 | 6 | 7 | 8 |
|---|---|---|---|---|
| Reactants added | none | CL | CL | CL |
| Mode of addition | — | continuous | continuous[2] | continuous[2] |
| Delay time until addition, min. | — | none | 15 | 30 |
| Epichlorohydrin, pbw | 95 | 95 | 95 | 95 |
| epsilon-Caprolactone, (CL) pbw | 5 | 5 | 5 | 5 |
| Toluene, phm | 430 | 430 | 430 | 430 |
| Cyclohexane, phm | 195 | 195 | 345 | 345 |
| Tetrahydrofuran, phm | 4.5 | 4.5 | 7.5 | 7.5 |
| Triisobutylaluminum, mhm | 30 | 30 | 30 | 30 |
| Water, mhm | 24 | 24 | 24 | 24 |
| Zinc Acetylacetonate, mhm | 3 | 4 | 4 | 4 |
| °C. | 70 | 70 | 70 | 70 |
| Hours | 8 | 8 | 8 | 8 |
| Conversion, wt. % | 82 | 80[1] | 85 | 93 |

[1]Reaction mixture set-up after 2 hrs. tending to impede the reaction
[2]epsilon-Caprolactone was added in a cyclohexane-toluene solution.

The above results, comparing runs 6, 7, and 8 of the invention to control run 5, illustrate the desirability of adding the lactone during the polymerization period, and particularly employing a short delay prior to commencement of the incremental or continuous addition. The products so obtained were rubbery.

Example III

In these runs, a lactone in admixture with an oxirane (other than epichlorohydrin) or with an oxetane was added to the epichlorohydrin incrementally as the monitored mode. The results of these runs are shown in Table III.

TABLE I

| Run | 1 | 2 | 3 | 4 |
|---|---|---|---|---|
| Cyclohexane, phm[1] | 195 | 195 | 195 | 195 |
| Toluene, phm | 430 | 430 | 430 | 430 |
| Tetrahydrofuran, phm | 4.5 | 4.5 | 9 | 9 |
| Epichlorohydrin, pbw[2] | 95 | 95 | 90 | 90 |
| epsilon-Caprolactone, pbw | 5 | 5[4] | 10 | 10[4] |
| Triisobutylaluminum, mhm[3] | 30 | 30 | 30 | 30 |
| Zinc acetylacetonate, mhm | 3 | 3 | 3 | 3 |
| Water, mhm | 24 | 24 | 24 | 24 |
| Hours | 18.5 | 21 | 19 | 21 |
| °C. | 70 | 70 | 70 | 70 |
| Conversion, wt. % | 91.8 | 98.8 | 73.3 | 94.0 |

[1]Parts per hundred parts monomer
[2]Parts by weight
[3]Gram millimoles per 100 grams monomer
[4]A quarter of the indicated amount was added initially with additional quarter amount increments added after 1 hr., 2 hrs., and 3 hrs.

Runs 2 and 4, conducted according to the process of our invention, demonstrate the superiority of the incremental addition of lactone over simply charging the The resulting polymeric products illustrate terpolymerization of three monomers according to the process of our invention and further illustrates the high conver-

TABLE III

| Run | 9 | 10 |
|---|---|---|
| Reactants added incrementally | BCMO + CL | PO + CL |
| Epichlorohydrin, pbw | 85 | 85 |
| epsilon-Caprolactone, (CL) pbw | 5 | 5 |
| Propylene oxide, (PO) pbw | — | 10 |
| 2,2-di(chloromethyl)oxetane, pbw (BCMO) | 10 | — |
| Toluene, phm | 868 | 868 |
| Tetrahydrofuran, phm | 4.5 | 4.5 |
| Triisobutylaluminum, mhm | 30 | 30 |
| Zinc acetylacetonate, mhm | 3 | 3 |
| Water, mhm | 24 | 24 |
| °C. | 70 | 70 |
| Hrs. | 22 | 22 |
| Conversion, wt. % | 85.4 | 84.3 | sion of our process, with the products being rubbery in nature.

Example IV

These runs employed the continuous addition of lactone in admixture with ethylene oxide to an admixture of epihalohydrin and catalyst. Results are shown in Table IV.

The resulting products were terpolymer obtained from our process. The runs show good conversion. The products were rubbery. The higher conversion of delayed commencing of monitored addition was shown.

TABLE IV

| Run | 11 | 12 |
|---|---|---|
| Reactants being added continuously | EO + CL | EO + CL |
| Time delay until addition, min. | none | 30 |
| Epichlorohydrin, pbw | 85 | 85 |
| Ethylene oxide, (EO) pbw | 10 | 10 |
| epsilon-Caprolactone, (CL) pbw | 5 | 5 |
| Toluene, phm | 430 | 430 |
| Cyclohexane, phm | 235 | 235 |
| Tetrahydrofuran, phm | 2.5 | 7.5 |
| Triisobutylaluminum, mhm | 30 | 30 |
| Water, mhm | 24 | 24 |
| Zinc acetylacetonate, mhm | 4 | 4 |
| °C. | 70 | 70 |
| Hours | 8 | 8 |
| Addition period, hrs.[1] | 7.5 | 6 |
| Conversion, wt. % | 80 | 100 |

[1] Additions made with EO + CL dissolved in toluene-cyclohexane solution

Example V

Further runs were made to illustrate the practice of the invention. Results are shown in Table V below. Runs 14 and 15 were each carried out in two sections with subsequent combination of products from both sections. Evaluation data were obtained on the respective combined products.

TABLE V

| Run | 13 | 14 | | 15 | |
|---|---|---|---|---|---|
| Mode of addition | —[1] | batch[2] | batch[2] | continuous[3] | continuous[3] |
| Time delay until addition, min. | 0 | 15 | 15 | 5 | 5 |
| Toluene, phm | 600 | 560 | 560 | 560 | 560 |
| Cyclohexane, phm | 160 | 160 | 160 | 160 | 160 |
| Tetrahydrofuran, phm | 7.5 | 7.5 | 7.5 | 7.5 | 7.5 |
| Epichlorohydrin, pbw | 92 | 92 | 92 | 92 | 92 |
| epsilon-Caprolactone, pbw | 8 | 8 | 8 | 8 | 8 |
| Triisobutylaluminum, mhm | 30 | 30 | 30 | 30 | 30 |
| Water, mhm | 24 | 24 | 24 | 24 | 24 |
| Zinc acetylacetonate, mhm | 4 | 4 | 4 | 4 | 4 |
| °C. | 80 | 70 | 70 | 70 | 70 |
| Hrs. | 6 | 8 | 8 | 8 | 8 |
| % Conversion, wt. % | 50 | 84 | 92 | 98 | 98 |
| Nature of polymer | soft | rubbery | | rubbery | |
| Shore A Hardness, ASTM D2240-68 | | | | | |
| 1 hour after cure[4,5,6] | | | 57 | | 58 |
| 7 days after cure[4,5,6,8] | | | 80 | | 84 |
| Compression Set, %[7] | | | | | |
| 3 days after cure[5,6] | | | 13.4 | | 12.7 |

[1] epsilon-Caprolactone was charged prior to charging the initiator.
[2] epsilon-Caprolactone was added in one batch 15 minutes after initiation.
[3] epsilon-Caprolactone was added over a period of 6 hrs. starting 5 minutes after initiation.
[4] Determined on specimens which had been tested for compression set.
[5] The cure procedure, applied in runs 14 and 15 in connection with Shore A Hardness and Compression Set testing, was carried out on a roll mill at 158° F. in accordance with the following recipe with the ingredients being listed in the order in which they were charged.

|  | Parts by Weight |
|---|---|
| Polymer | 100 |
| Nickel dibutyldithiocarbamate | 1 |
| Dibasic lead phosphate | 5 |
| Carbon black[8] added incrementally | 30 |
| Neutral waxes and wax derivatives | 1 |
| 2-Mercaptoimidazole | 1.5 |

[6] Polymer was excessively soft and not suitable for testing.
[7] ASTM D 395 61 Method B modified as follows: Compression devices are used with 0.325-inch spacers to give a static compression for the 0.5-inch pellet of 35%. The test is run for two hours at 212° F. plus a relaxation (after treatment) of one hour at 212° F.
[8] Carbon black ASTM identification N550 under ASTM D2516-66T.

It will be noted that the delay of addition illustrated by run 14 can be desirable even in the absence of incremental or continuous addition.

The polymers produced in accordance with this invention have good low temperature flexibility, are resistant to the effects of heat and to the effects of ozone. Moreover, these polymers are characterized by exhibiting excellent resistance to swell and degradation on exposure to hydrocarbons. The polymers have wide utility in the automobile industry for fabricating articles such as motor mounts, body mounts, suspension system parts, hoses, tubing, and the like. General utility includes applications in the gasket and container fields.

Certainly, reasonable variations and modifications of our invention are possible yet still within the scope of our disclosure and without departing from the intended scope and spirit thereof.

We claim:

1. A copolymerization process which comprises the steps:
   a. admixing at least one monohalooxirane monomer or monohalooxirane monomer and a lactone and an initiator system consisting essentially of (A) (I) an organoaluminum compound and (II) water or lower alcohol, or (B) (I) an organoaluminum compound, (II) water or lower alcohol, and (III) a beta-diketone or metal salt of a beta-diketone,
   b. commencing polymerization of the admixture of said step a) under polymerization conditions,
   c. adding thereto during at least a portion of the polymerization of said step (b) a further monomer comprising a lactone, a lactone and an oxirane, a lactone and an oxetane, or a lactone and oxirane and oxetane wherein the addition of said further monomer is delayed after the initiation of said polymerization for a time of about 0.5 to 120 minutes, thereby copolymerizing said monohalooxirane monomer and said further monomer,
   wherein said (I) organoaluminum compound is represented by $R_a'AlX_b'$ wherein $a$ is an integer of 1–3, $b$ is an integer and is 1 or 2, such that $a + b = 3$, X' is hydrogen or halogen, and R' is a hydrocarbon radical.

2. The process according to claim 1 wherein said oxirane and said oxetane are represented by:

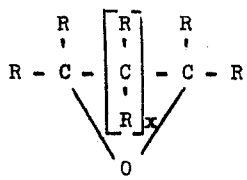

wherein $x$ is 0 for said oxirane, and $x$ is 1 for said oxetane, said oxirane or oxetane contain up to 20 carbon atoms per molecule, and each R is hydrogen or hydrocarbyl.

3. The process according to claim 1 wherein said monohalooxirane is represented by:

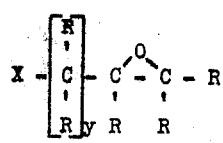

wherein each R is hydrogen or hydrocarbyl, X is chlorine, bromine, or fluorine, and $y$ is an integer of 1 to 6, and said monohalooxirane contains up to 20 carbon atoms per halooxirane.

4. The process according to claim 1 wherein said lactone is represented by:

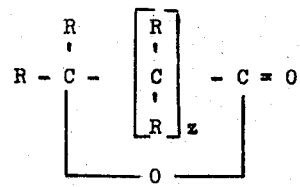

wherein each R is hydrogen or hydrocarbyl, $z$ is an integer of 1 to 10, and said lactone contains up to 20 carbon atoms per lactone.

5. The process according to claim 1 wherein said admixture of said initiator system and said monohalooxirane monomer further contains an oxirane or oxetane, and said lactone monomer is added thereto in said step (c).

6. The process according to claim 1 wherein in said step (c) said lactone monomer is added during the polymerization of said monohalooxirane by monitored addition which is in discrete periodic additions, or substantially continuously.

7. The process according to claim 6 wherein the lactone portion of the monomers employed represents 0.5 to 95 parts, and the oxirane and monohalooxirane together correspondingly represent 95.5 to 5 parts, and wherein of the total of 100 parts oxirane and halooxirane, the halooxirane represents from 25 to 75 parts.

8. The process according to claim 7 wherein said catalyst system is said (B).

9. The process of claim 8 wherein said (III) is said metal salt of a beta-diketone wherein the metal employed therein is a metal of Group IIA, IIIA, IVA, IB, IIB, IVB, VA, VIB, VIIB, or VIII.

10. The process according to claim 9 wherein said metal salt of a beta-diketone can be represented by:

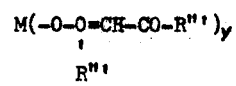

wherein M represents said metal, each R''' contains up to 10 carbon atoms per group, and $y$ is an integer equal to the valence of the metal M.

11. The process according to claim 9 wherein said metal is beryllium, magnesium, calcium, strontium, barium; boron, aluminum, gallium, indium, thallium; silicon, germanium, tin, lead; copper, silver; zinc, cadmium, mercury; titanium, zirconium, vanadium, niobium, tantalum; chromium, molybdenum, tungsten; manganese; iron, cobalt, nickel, ruthenium, rhodium, palladium, osmium, iridium, and platinum.

12. The process according to claim 8 wherein said catalyst is employed in an amount sufficient to provide about 1 to 100 gram millimoles of organoaluminum compound per 100 grams of total monomer employed, and wherein the amount of beta-diketone:organoaluminum compound is in the range of from 0.01:1 to 0.5:1, and the amount of water or lower alcohol is in the range of about 0.02 to 1.6 moles per mole of organoaluminum compound.

13. The process according to claim 12 wherein said copolymerization is conducted at temperatures in the range of about 5° C. to 150° C., the polymerization pressure is sufficient to maintain reactants substantially in the liquid phase, and said copolymerization is conducted in a hydrocarbon or halogenated hydrocarbon or ether or mixture diluent.

14. The process according to claim 13 wherein said monohalooxirane is an epihalohydrin.

15. The process according to claim 14 wherein said lactone is epsilon-caprolactone, said halooxirane is epichlorohydrin, and said catalyst system comprises triisobutylaluminum, zinc acetylacetonate, and water.

16. The process according to claim 14 wherein said halooxirane is epichlorohydrin, said lactone is epsilon-caprolactone, and said oxirane is propylene oxide or 2,2-di(chloromethyl)oxetane, and said catalyst system comprises triisobutylaluminum, zinc acetylacetonate, and water.

17. The process according to claim 8 wherein in said copolymerization process further employs a catalyst activator which is an ether.

* * * * *